United States Patent
Gordon et al.

(10) Patent No.: US 10,630,676 B2
(45) Date of Patent: Apr. 21, 2020

(54) PROTECTING AGAINST MALICIOUS DISCOVERY OF ACCOUNT EXISTENCE

(71) Applicant: MICROSOFT TECHNOLOGY LICENSING, LLC, Redmond, WA (US)

(72) Inventors: Ariel Gordon, Kirkland, WA (US); Timothy Colin Larson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 166 days.

(21) Appl. No.: 15/822,065

(22) Filed: Nov. 24, 2017

(65) Prior Publication Data

US 2019/0166112 A1  May 30, 2019

(51) Int. Cl.
*H04L 29/06* (2006.01)
*G06F 21/31* (2013.01)
*G06F 21/55* (2013.01)

(52) U.S. Cl.
CPC ............ *H04L 63/083* (2013.01); *G06F 21/31* (2013.01); *G06F 21/554* (2013.01); *H04L 63/102* (2013.01); *H04L 63/1441* (2013.01)

(58) Field of Classification Search
CPC . H04L 63/083; H04L 63/102; H04L 63/1441; G06F 21/31; G06F 21/554
USPC .......................................................... 726/6
See application file for complete search history.

(56) References Cited

U.S. PATENT DOCUMENTS

| 7,103,776 B1 * | 9/2006 | Hall ........................ G06F 21/31 455/404.1 |
| 8,302,187 B1 | 10/2012 | Gupta et al. |
| 8,312,540 B1 * | 11/2012 | Kahn .................... G06F 21/552 713/183 |
| 8,452,980 B1 * | 5/2013 | Black .................... G06F 21/554 713/185 |
| 8,875,255 B1 * | 10/2014 | Dotan ..................... G06F 21/31 713/182 |
| 8,904,506 B1 | 12/2014 | Canavor et al. |
| 9,098,689 B2 | 8/2015 | Gordon et al. |
| 9,148,424 B1 | 9/2015 | Yang |
| 9,237,143 B1 | 1/2016 | Dotan et al. |

(Continued)

OTHER PUBLICATIONS

"International Search Report and Written Opinion Issued in PCT Application No. PCT/US18/061716", dated Jan. 29, 2019, 11 pages.

(Continued)

*Primary Examiner* — Shahriar Zarrineh
(74) *Attorney, Agent, or Firm* — Rainier Patents, P.S.

(57) ABSTRACT

A sign-in system can be protected against enumeration attacks while providing an improved sign-in experience for legitimate users by disclosing whether or not an account exists. An account within a specified domain can be identified by an account identifier such as a username. Before a threshold throttling value is reached, account existence/nonexistence information can be provided in response to an access request. In response to reaching or exceeding a specified threshold throttling value, account existence/nonexistence information can cease to be provided. Entering a valid account identifier/authenticating credential credentials pair provides access to the computer system regardless of whether or not the threshold was reached or exceeded or not reached.

16 Claims, 7 Drawing Sheets

---

SIGN-IN USER INTERFACE 120

SIGN IN someuser@somedomain.com —— 122b
122a

\*\*\*\*\*\*\*\* —— 122d
122c

UNRECOGNIZED USERNAME OR PASSWORD
↘ 122f

SIGN IN  122e

---

PASSWORD INPUT INTERFACE 124 invalidusername@somedomain.com —— 126a

ENTER PASSWORD  126b

Your account or password is incorrect. If you do not remember your password, reset it now.

Password

Back  126d    SIGN IN

(56) References Cited

U.S. PATENT DOCUMENTS

| | | | | |
|---|---|---|---|---|
| 9,485,255 B1* | 11/2016 | Avital | ................... | H04L 63/10 |
| 2002/0188862 A1* | 12/2002 | Trethewey | ............ | H04L 63/083 |
| | | | | 726/4 |
| 2003/0120948 A1* | 6/2003 | Schmidt | .............. | H04L 63/0815 |
| | | | | 726/8 |
| 2003/0163737 A1* | 8/2003 | Roskind | .................. | G06F 21/31 |
| | | | | 726/6 |
| 2004/0003287 A1* | 1/2004 | Zissimopoulos | ... | H04L 63/0428 |
| | | | | 726/10 |
| 2006/0161554 A1* | 7/2006 | Lucovsky | ............. | G06F 21/335 |
| 2007/0005985 A1* | 1/2007 | Eldar | ................... | G06Q 20/206 |
| | | | | 713/183 |
| 2009/0092050 A1* | 4/2009 | Buch | ....................... | H04L 51/12 |
| | | | | 370/236 |
| 2013/0145174 A1* | 6/2013 | Hallum | .................. | G06Q 10/10 |
| | | | | 713/189 |
| 2013/0198819 A1* | 8/2013 | Gordon | .................. | G06F 21/31 |
| | | | | 726/5 |
| 2015/0135302 A1* | 5/2015 | Cohen | ................. | H04L 67/2823 |
| | | | | 726/12 |
| 2015/0156170 A1* | 6/2015 | Gurbani | ................ | G06F 21/554 |
| | | | | 726/12 |
| 2015/0350193 A1 | 12/2015 | Honda et al. | | |
| 2016/0026796 A1* | 1/2016 | Monrose | ............... | G06F 21/562 |
| | | | | 726/24 |
| 2016/0072793 A1* | 3/2016 | Brock | ................... | G06F 16/951 |
| | | | | 726/6 |
| 2016/0226911 A1* | 8/2016 | Boss | ........................ | H04L 63/20 |
| 2017/0078322 A1* | 3/2017 | Seiver | ................. | H04L 43/0876 |
| 2017/0134362 A1* | 5/2017 | Randall | ................. | H04L 63/083 |
| 2017/0230406 A1* | 8/2017 | Gould | .................... | G06Q 20/36 |
| 2018/0139235 A1* | 5/2018 | Desai | .................. | H04L 63/1483 |

OTHER PUBLICATIONS

Sullivan, Bryan, "Preventing a Brute Force/Dictionary Attack", Retrieved From: http://www.continuitycentral.com/feature0429.htm, Retrieved Date: Aug. 24, 2010, Published Date: Jan. 17, 2007, 3 Pages.

"Blocking Brute Force Attacks", Retrieved From<<https://www.owasp.org/index.php/Blocking_Brute_Force_Attacks>>, Sep. 11, 2006, 5 Pages.

"Generic error message for wrong password or username—is this really helpful?", Retrieved from<<https://security.stackexchange.com/questions/62661/generic-error-message-for-wrong-password-or-username-is-this-really-helpful>>, Jul. 9, 2014, 4 Pages.

Allo, Bryan, "User Enumeration | Online Security", Retrieved from<<https://www.astechconsulting.com/blog/online-security>>, Mar. 9, 2016, 8 Pages.

* cited by examiner

PASSWORD INPUT INTERFACE 136 validusername@somedomain.com —— 138a

Your password is incorrect. If you do not remember your password, reset it now. —— 138b

********

Back | SIGN IN

FIG. 1e

USERNAME INPUT INTERFACE 140

Username does not exist. —— 142b invalidusername@somedomain.com —— 142a

FIG. 1f

SIGN-IN USER INTERFACE 144

SIGN IN

Unknown username, check that you have typed it correctly or ask your administrator to synchronize your account. —— 146b invalidusername@somedomain.com —— 146a

PROTECTING AGAINST MALICIOUS DISCOVERY OF ACCOUNT EXISTENCE

BACKGROUND

The importance of cyber security continues to increase as the use of computers continues to grow. Cyber security encompasses all aspects of protection of computer systems including theft of and damage to resources such as hardware, software, data and so on. Computer systems, and especially computer systems that provide services over public networks, can be the target of various attacks in which attempts to obtain unauthorized access to resources are made.

One type of attack is an enumeration attack. An enumeration attack is an attack in which an attacker makes a series of guesses and observes the system's response to determine if a guess was correct. The targeted computer system may inadvertently or deliberately provide information to illegitimate and legitimate actors about resources. For example, when erroneous credentials such as account identifier credentials and/or authenticating credentials are submitted, the targeted computer system may return a message that states that the credentials provided are invalid, thereby letting an attacker know that, for example, either a username or password is incorrect. Some known systems will identify what portion of the credentials are incorrect. For example, a system may provide an error message that states that a provided username is present on the system, thereby letting the attacker know that the username portion of the credentials is valid. The information obtained by the attacker can be used in other attacks that attempt to get enough information so that the attacker can acquire illegitimate access to the system.

SUMMARY

An improved sign-in experience can be provided by disclosing the existence or non-existence of a username and/or authenticating credential such as password in a particular domain while protecting against illegitimate discovery of account existence. An account can be identified by an account identifier such as a username. Before a threshold throttling value is reached, account existence/non-existence information can be provided in response to an access request. In response to reaching or exceeding the specified threshold throttling value, account existence/non-existence information can cease to be provided. Entering a valid credentials pair (e.g., valid username and valid password pair) can provide access to an application utilizing the sign-in service regardless of whether or not the threshold throttling value was reached, exceeded or not reached.

One or more of: the frequency (quantity or volume over a particular specified time period) of access requests for a particular username, the quantity of requests for a particular username per session, the frequency of valid requests for a particular username, frequency of invalid requests for a particular username, the quantity of valid requests for a particular username, the quantity of invalid requests for a particular username per session, the frequency of requests to access a domain associated with a username, the volume of requests to access a domain associated with a username per session, the frequency of valid requests to access a domain associated with a username, the volume of valid requests to access a domain associated with a username per session, the frequency of invalid requests to access a domain associated with a username, the volume of invalid requests to access a domain associated with a username per session, the frequency of requests from a particular IP address or range of IP addresses to a particular username, the quantity of requests from a particular IP address or range of IP addresses to a particular username per session, the frequency of valid requests from a particular IP address or range of IP addresses to access a particular username, the volume of valid requests from a particular IP address or range of IP addresses to access a particular username per session, the frequency of invalid requests from a particular IP address or range of IP addresses to access a particular username, the volume of invalid requests to access a particular username per session, the frequency of requests from a particular IP address or range of IP addresses to a particular domain associated with a username, the quantity of requests from a particular IP address or range of IP addresses to a particular domain associated with a username, the frequency and/or quantity pre session of access requests from the IP address(es) to the domain that succeed (the user is able to sign in) and the frequency and/or quantity per session of access requests from the IP address(es) to the domain that fail (the user is unable to sign in) can be monitored and saved.

A current risk value can be determined dynamically by updating and using any combination of the saved information. When the determined risk value reaches or exceeds the threshold throttling value, account existence/non-existence information can cease to be provided in response to any access request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

A computer system that provides services, especially a system connected to a public network, can be the subject of attack by those who are interested in gaining unauthorized access to resources of the computer system. For example, one common resource that is commonly a subject of an enumeration attack is account identification information (e.g., username). Finding a valid username is typically the first step in finding a valid username and password pair that enables an unauthorized individual to obtain illegitimate access to resources of a computer system. While a particular user can be the subject of an attack, the individual user is typically less enticing to an attacker than is an enterprise. A complete list of employee usernames of a big enterprise is a highly prized commodity among attackers.

A valid credentials pair (e.g., a valid identifying credential such as username and the associated valid authenticating credential such as a password) is needed for authentication. The existence of a user account allows a user to authenticate to a computer system. Authentication is not the same as authorization. Authorization is also needed to access resources provided by or connected to the computer system. To receive authorization to log into or sign in to an account, a user typically identifies himself as an account holder by entering a valid account identifier credential. The user authenticates himself or herself with some type of authentication credential. Authentication credentials include but are not limited to: passwords, one-time use passwords, certificates, biometrics such as but not limited to fingerprint and iris scanners, voice and facial recognition, Trusted Platform Modules (TPM), USB security tokens, embedded Secure Elements (eSE), smart cards, near field communication (NFC) and so on. Authentication over a network may employ public-key/private-key cryptography. A "password" as used herein can be any form of authentication credential used to prove the identity of the user to gain access to a resource. For example, a password can be a word, multiple words, a combination or string of characters, an access code, an image, biometric data or any type of information that in theory is kept secret from those not allowed access.

The account identifier (identifying credential) can be a username. A user identifier can be in User Principal Name (UPN) format such as UserName@OrganizationName.com. The portion before the "@" is the portion of the username (UserName) which identifies the account holder. The OrganizationName.com portion identifies the domain in which the account exists. A domain name represents an Internet Protocol (IP) resource, such as a personal computer, a server computer hosting a web site, the web site itself or any other service accessed via the Internet. In general, if the username and password are a valid credentials pair, access to the computer system is provided. If the username and password are not a valid credentials pair (e.g., are an invalid pair), access is denied.

Traditionally, the two basic approaches to disclosing information about usernames are to never disclose account existence or to always disclose account existence. Disclosing the existence or non-existence of an account makes it easier for an attacker to assemble a list of valid usernames of an enterprise. Always disclosing account existence creates vulnerabilities to attack that many organizations are not willing to accept. Never disclosing account existence can be difficult to implement effectively. For example, even if the same response is returned to the requester when a username is unknown and when password is unknown, typically an attacker can infer that the account exists by comparing the response time from the system. (It takes longer to check for both known username and known credential than it does to check only for known username. Therefore, if the response is returned comparatively quickly, it can be inferred that the username rather than the password is invalid.)

Figure 1A:
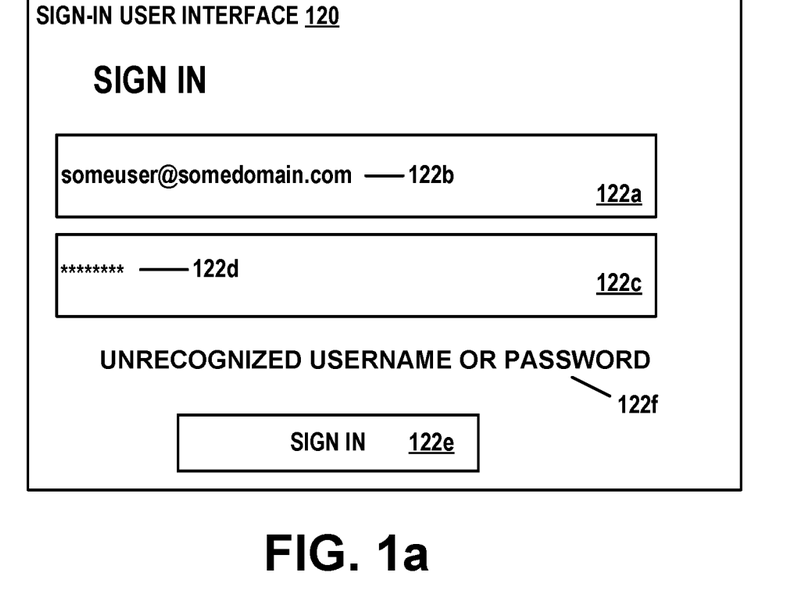
FIG. 1a is a block diagram representing an example of a sign-in user interface 120 displaying an ambiguous message.

One way to avoid disclosing the existence of an account is to provide an ambiguous error message. An ambiguous error message fails to identify what portion of the username/password pair is invalid. FIG. 1a illustrates an example of a sign in user interface 120 that displays the ambiguous error message "UNRECOGNIZED USERNAME OR PASSWORD" 122f. A user can be prompted for account identifier (e.g., username) 122a and can enter a username (e.g., someuser@somedomain.com 122b) at 122a. The user can be prompted for password at 122c even if the username is invalid. The user can enter a typically hidden password represented by asterisks 122d. SIGN IN 122e can be selected. If either the username or password are not known, an ambiguous error message such as "UNRECOGNIZED USERNAME OR PASSWORD" 122f can be displayed.

The error message is ambiguous because the error could be in the individual portion of the username (in the "someuser" part of the username), in the domain part of the username (in the "somedomain.com" part of the username). The error could be in the password part of the username/password pair. The error could be encountered because the directory in which the username is located at an organization is not synchronized or is not fully synchronized with the directory for the organization located at the sign-in service.

Figure 1B:
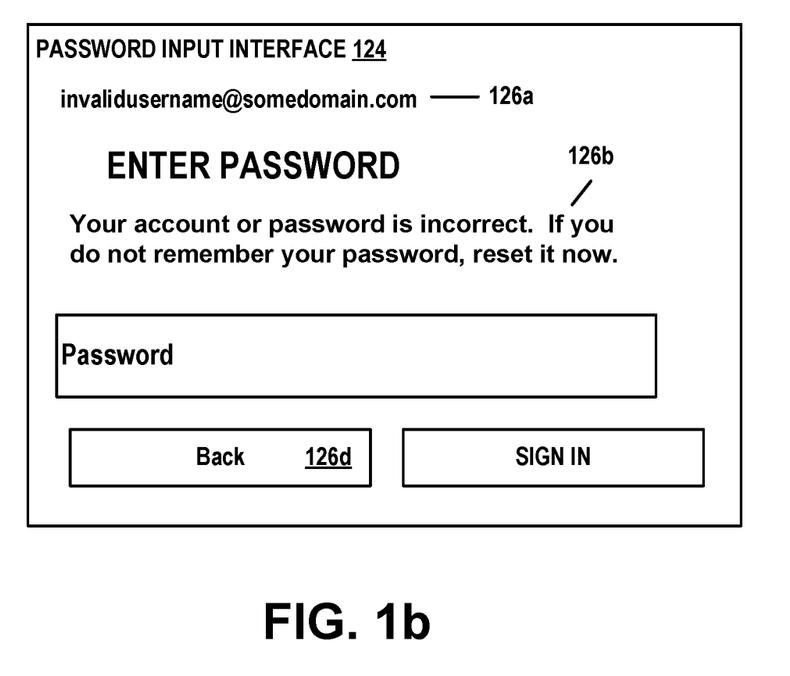
FIG. 1b is a block diagram representing an example of a password input interface 124 displaying an ambiguous message.

Some sign-in systems separate username and password input into separate interfaces or pages. FIG. 1b illustrates an example of a user interface that can be provided to a user who has entered an incorrect username, invalidusername@somedomain.com 126a on a previous username input interface (not shown). In response to input of an invalid username, an interface such as PASSWORD INPUT INTERFACE 124 in which an ambiguous error message such as "Your account or password is incorrect. If you do not remember your password, reset it now." 126b can be shown. If the user figures out that he has entered an invalid username and wants to correct it, the user is required to use a back function such as Back 126d to edit the username.

While an ambiguous message helps to protect the system from attack, the user can find it frustrating. A user typically finds it very helpful to know when a typographical error has been made in the username rather than in the password or if the user's account has not been synchronized to the sign-in system. If the error is made in the username and a valid password is entered, the user typically thinks that the error was made in the password because the username is often simpler and is entered more often and because the password is typically hidden. Hence, the user would find it very helpful to know at least when the username entered is invalid and when the password entered is invalid. However, the username could be invalid because the user is a legitimate user who made a typographical error or the username could be invalid because the user is an attacker who is trying to get valid usernames in a given domain by an enumeration attack. It is desirable to help the legitimate user without helping the attacker.

In accordance with aspects of the subject matter disclosed herein, an intermediate approach is taken that provides both an improved user experience to users who have a high probability of being legitimate users and provides protection against enumeration attacks. A threshold throttling value can be specified. The threshold throttling value can be tailored to a particular user or type of user. For example, the threshold throttling value can be larger for an enterprise that has many employees or consumer users and smaller for an enterprise that has fewer employees or consumer users. The threshold throttling value can be larger for larger enterprises (however "large" is measured) and smaller for smaller enterprises. The threshold throttling value can be smaller for enterprises that hold highly sensitive information and larger for enterprises that hold less sensitive information, and so on. The threshold throttling value can be tailored to a particular domain or to characteristics of different types of domains and/or to the sensitivity of the information the domain holds. The throttling threshold value can be dynamically changed according to the time of the day, the amount of traffic on the site, etc. The threshold throttling value can be modified dynamically (as the sign-in service operates) using machine learning techniques.

In accordance with aspects of the subject matter disclosed herein, each time an account access request is received, a risk value can be dynamically determined from a combination of factors including one or more of: the frequency (quantity or volume over a particular specified time period) of access requests for a particular username, the quantity of requests for a particular username per session, the frequency of valid requests for a particular username, frequency of invalid requests for a particular username, the quantity of valid requests for a particular username, the quantity of invalid requests for a particular username per session, the frequency of requests to access a domain associated with a username, the volume of requests to access a domain associated with a username per session, the frequency of valid requests to access a domain associated with a username, the volume of valid requests to access a domain associated with a username per session, the frequency of invalid requests to access a domain associated with a username, the volume of invalid requests to access a domain associated with a username per session, the frequency of requests from a particular IP address or range of IP addresses to a particular username, the quantity of requests from a particular IP address or range of IP addresses to a particular username per session, the frequency of valid requests from a particular IP address or range of IP addresses to access a particular username, the volume of valid requests from a particular IP address or range of IP addresses to access a particular username per session, the frequency of invalid requests from a particular IP address or range of IP addresses to access a particular username, the volume of invalid requests to access a particular username per session, the frequency of requests from a particular IP address or range of IP addresses to a particular domain associated with a username, the quantity of requests from a particular IP address or range of IP addresses to a particular domain associated with a username, the frequency and/or quantity pre session of access requests from the IP address(es) to the domain that succeed (the user is able to sign in) and the frequency and/or quantity per session of access requests from the IP address(es) to the domain that fail (the user is unable to sign in)

For example, the risk value can be based on a number of invalid requests from a particular IP address(es) within a time period, from a ratio of invalid and valid access requests from the particular IP address(es) within the time period, from a ratio of all requests from a particular IP address(es) within the time period and valid access requests from the particular IP address(es) within the time period, from a ratio of all requests from the particular IP address(es) within the time period and invalid access requests from the particular IP address(es) within the time period and so on.

As a specific non-limiting example, suppose a threshold throttling value for Organization A is set to 100 invalid access requests from the same IP address received within 5 minutes. Access requests coming in to access Organization A from a particular IP address (e.g., IP address X) within a 5 minute time period can be monitored and collected. Invalid access requests 1 to 99 to access Organization A from IP address X within the 5 minute time period will result in unambiguous messages being provided in response to the access request. When the $100^{th}$ invalid access request to access Organization A from IP address X is received within the 5 minute time period, an ambiguous message is provided in response to the $100^{th}$ invalid access request. Ambiguous messages will continue to be provided in response to any additional invalid and valid access requests received from IP address X for the remainder of the session or until the threshold throttling value is reset to a greater value or until the quantity of requests to access Organization A from IP address X within a 5 minute time period falls below 100.

In accordance with some aspects of the subject matter described herein, until the threshold throttling value is reached or exceeded by the risk value, account existence/non-existence is revealed, providing an enhanced user experience. Once the threshold throttling value is reached or exceeded, existence/non-existence of the account is not revealed for any future access requests. In accordance with some aspects of the subject matter disclosed herein, after the threshold throttling value is reached or exceeded, whether a valid account identifier is entered or whether a valid account identifier is not entered, the requester is prompted for password. If the password is correct, the user can sign in successfully. If the password is incorrect, an ambiguous error message such as but not limited to "invalid username or password" can be returned. If the username does not exist, an ambiguous error message which may be identical to that provided when the password is incorrect, e.g., "invalid username or password" can be returned. Whether the threshold throttling value is not reached or exceeded or is reached or exceeded, entering valid credentials (e.g., a valid username and password pair) always provides access to the computer system. It will be appreciated that although as described herein, reaching the threshold throttling value triggers the change in behavior, the change in behavior may alternatively be triggered when the threshold throttling value is exceeded.

In accordance with aspects of the subject matter disclosed herein, an enhanced user experience for the majority of legitimate users is provided because in the majority of cases, the risk value associated with the legitimate user's invalid attempts will fall below the threshold throttling value. The user experience is enhanced because instead of getting an ambiguous error message that does not identify what portion of the credential is invalid, when the account identifier (e.g., username) is invalid, an error message will identify that the account identifier is invalid and when the password is invalid, an error message will identify that the password is invalid. In accordance with some aspects of the subject matter disclosed herein, when the domain name portion of the username is invalid, an error message identifies that the domain name is invalid.

Figure 1C:
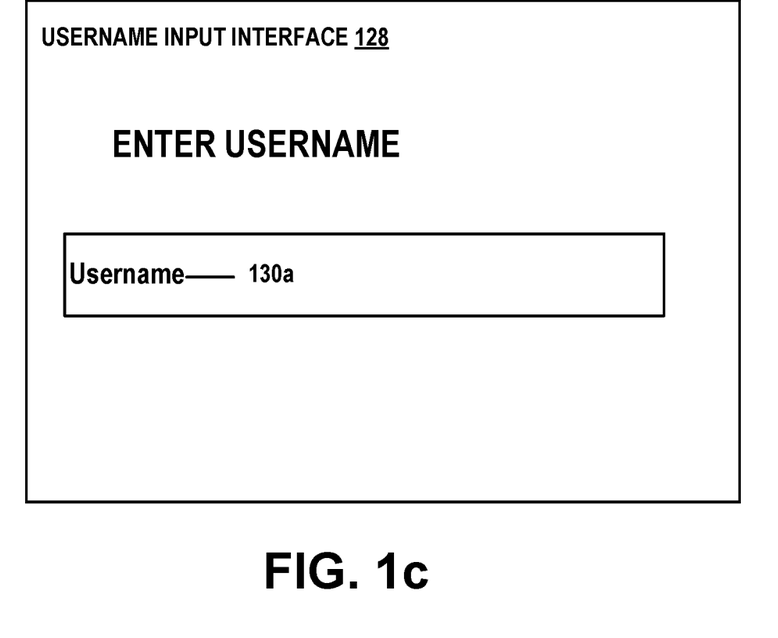
FIG. 1c is a block diagram representing an example of a username input interface 128 in accordance with aspects of the subject matter disclosed herein.
Figure 1D:
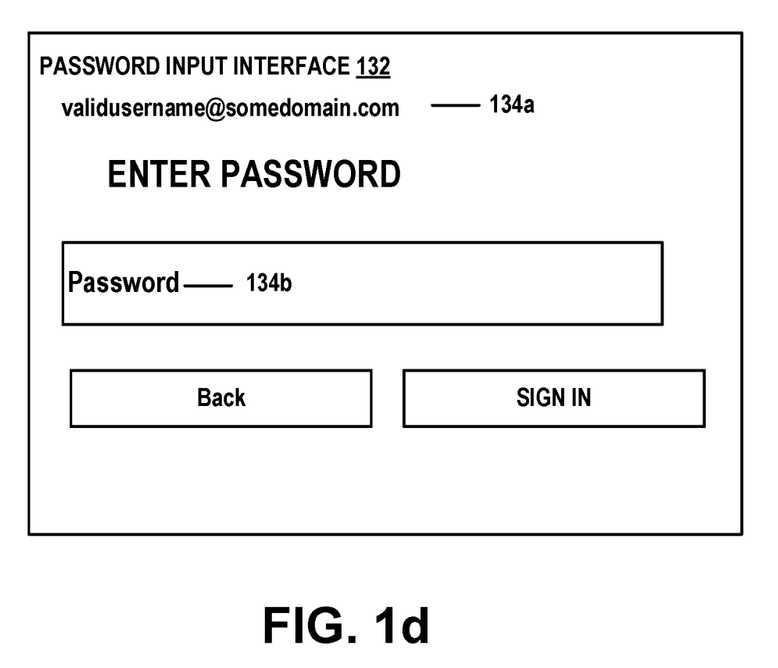
FIG. 1d is a block diagram representing an example of a password input interface 132 in accordance with aspects of the subject matter disclosed herein.
Figure 1E:
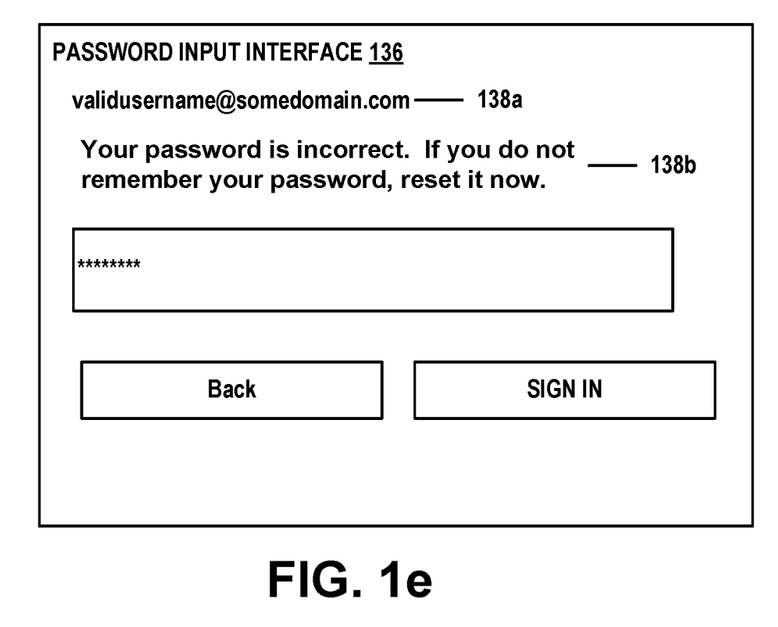
FIG. 1e is a block diagram representing an example of a password input interface 136 in accordance with aspects of the subject matter disclosed herein.

For example, FIG. 1c illustrates an example of a username input interface 128 in which a user is prompted for username 130a. In accordance with aspects of the subject matter disclosed herein, if the request is under the throttling threshold and the username does exist in the domain, existence of the username can be disclosed, as illustrated in FIG. 1d. FIG. 1d illustrates a PASSWORD INPUT INTERFACE 132 in which validusername@somedomain.com 134a is identified as a valid username and the user is prompted for password 134b. In response to input of a valid username and password pair, the user can be allowed access to the system. In response to entering an invalid password, an interface such as PASSWORD INPUT INTERFACE 136 of FIG. 1e can be displayed in which validusername@somedomain.com 138a is identified as a valid username and an unambiguous error message such as "Your password is incorrect. If you do not remember your password, reset it now." 138b can be displayed.

Figure 1F:
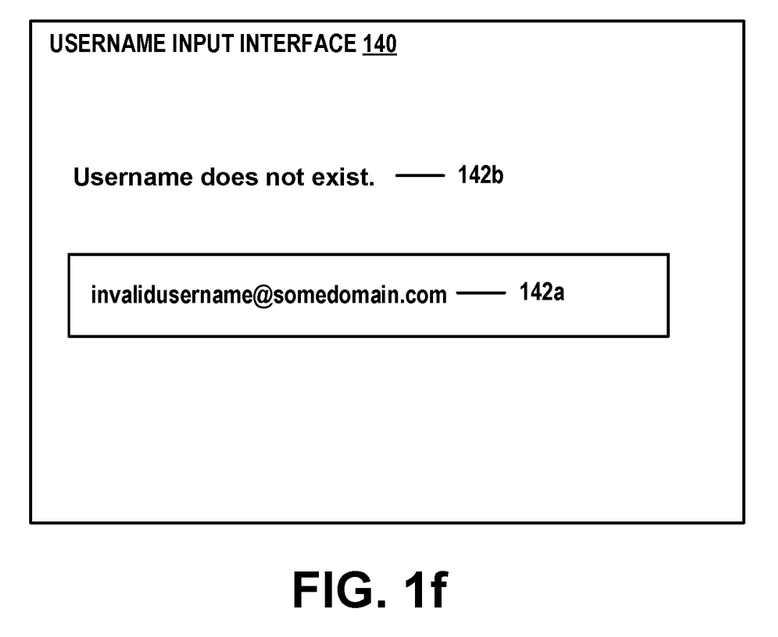
FIG. 1f is a block diagram representing an example of a user input interface 140 in accordance with aspects of the subject matter disclosed herein.
Figure 1G:
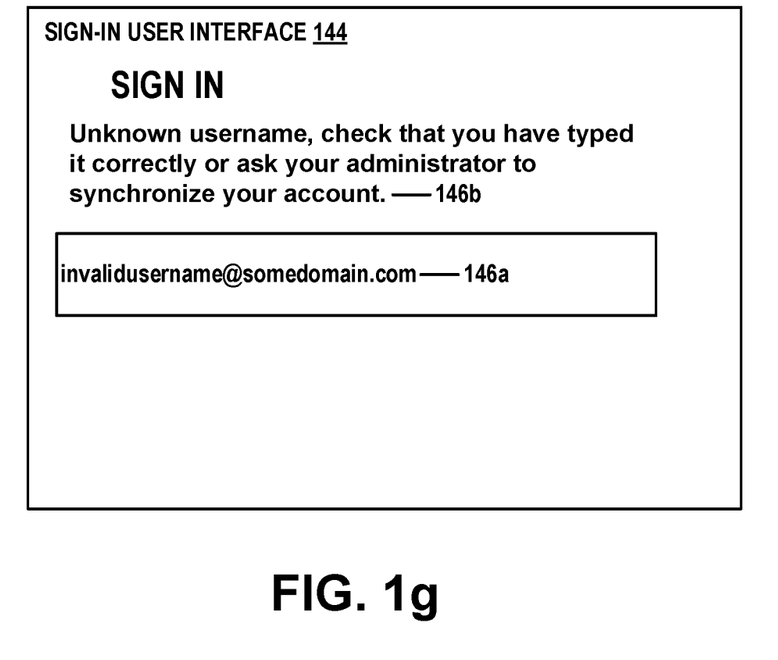
FIG. 1g is a block diagram representing an example of a sign-in user interface 144 in accordance with aspects of the subject matter disclosed herein.

If the risk value determined in response to a current access request is under the threshold throttling threshold and the username (e.g., invalidusername@somedomain.com 142a) does not exist in the domain, a username input interface such as the one shown in FIG. 1f can be displayed in which an unambiguous error message such as "Username does not exist." 142b can be displayed indicating unambiguously that the username does not exist. FIG. 1g illustrates an example of a sign-in user interface 144 that indicates that the username may not exist because the username directory at the organization has not been synchronized to the username directory of the sign-in service. Such a sign-in user interface may display a message such as "Unknown username, check that you have typed it correctly or ask your administrator to synchronize your account." 146b in response to receiving an invalid username such as invalidusername@somedomain.com 146a. If the risk value reaches or exceeds the threshold throttling value, ambiguous error messages can be displayed.

Sign-in services can be provided to different types of users. One type of user is the consumer user. One non-limiting example of a consumer user is a user who navigates to a public retail website to purchase goods. A second type of user is an organization or enterprise. To use the sign-in service, the enterprise user can "set up a tenant" by registering the enterprise to the sign-in system. A tenant is a group of users who share a common access to a software system or service. One example of a tenant is a group of employees of an enterprise. The domain name for the enterprise can be configured by entering data into an administrator-level interface and providing proof of ownership of the enterprise. The name chosen for the domain name often includes the name of the enterprise or a portion of the name of the enterprise. The enterprise's users can be synchronized to (disclosed to and retained by) the sign-in system. Typically but not always, the users are employees of the enterprise.

At this point, in some sign-in systems, the enterprise can choose to synchronize the users' passwords (or a derivative thereof, such as but not limited to a hash of the password) to the sign-in system. When users' passwords are synchronized to the sign-in system, the sign-in system may be able to verify username and password pairs and the sign-in system is said to be operating in managed mode. Alternatively, the enterprise can choose to perform its own sign-in validation processing. For example, a system owned or controlled by the enterprise can perform the validation of usernames and passwords. This mode of operation is called federated mode. In federated mode, a third party identity provider may perform password validation. The user of a sign-in system operating in federated mode can be redirected by the sign-in system to an enterprise-controlled location where the user may be asked for his or her username and/or password. Because the sign-in system operating in federated mode does not perform the credential validation processing, the sign-in system operating in federated mode is not able to verify the username and password pair. The federated sign-in system instead can collect the username and domain name and redirect the user to an enterprise-controlled location.

In known systems that provide no information about account existence, implementation for both federated and managed mode is based on the domain name. This is called domain level discovery. That is, the part of the username that precedes the "@" sign is ignored and no account existence information is provided. If an invalid user name such as, for example, invalidusername@managedenterprise.com is entered in managed mode, the user is prompted for a password and a message such as "unrecognized username or password" is returned. If an invalid user name such as invalidusername@federatedenterprise.com is entered in federated mode, the user is prompted for a password and a message such as "unrecognized username or password" is returned.

In accordance with aspects of the subject matter disclosed herein, if a risk value is greater than or equal to a throttling threshold value, domain level discovery can be performed. If the risk value is less than the throttling threshold value, user level discovery can be performed. User level discovery includes discovery of information specific to the particular user in addition to domain-level information. User level discovery can provide information concerning the existence/non-existence of username to an identity verification provider operating in managed or in federated mode. User level discovery can provide information concerning the existence/non-existence of passwords in managed mode. For example, if a throttling threshold value has not been reached in managed mode and an invalid username is received, an unambiguous error message such as "username unknown" can be displayed. If the throttling threshold value has not been reached in managed mode and a valid username but invalid password is received, an unambiguous error message such as "password unknown" can be displayed. If a throttling threshold value has not been reached in federated mode and an invalid username is received, an unambiguous error message such as "username unknown" can be displayed before processing is redirected to the application utilizing the sign-in service.

Information associated with the IP address of the computer originating the request can be collected. The information collected and persisted can include any information concerning the reputation of the device identified by IP address, the number and ratio of invalid access requests, valid access request and all access requests made against the target domain from the computer identified by the IP address. If a user request appears to be legitimate and an invalid username is received, the error message can disclose that the username does not exist. In accordance with some aspects of the subject matter disclosed herein, a user is inferred to be a valid user by monitoring the amount of traffic on the user's IP address. A low amount of traffic suggests the user is valid while a large number of access requests to the domain suggests an attacker.

To determine if the amount of traffic is low or high, the number of access requests per domain from a particular IP address to a particular IP address over a specified time period compared to a specified threshold volume can be tracked. This approach is likely to be useful when, for example, a large number of legitimate users are accessing a computer system from a particular IP address. The threshold may be reached even though no attack is taking place. The total number of access requests from a particular IP address to all IP addresses compared to a specified threshold can be tracked. This approach is likely to be useful to detect large scale attacks across multiple tenants.

In accordance with aspects of the subject matter disclosed herein, an IP address can be associated with a risk value. In accordance with aspects of the subject matter disclosed herein, an illegitimate user attempting to guess usernames initially receives the same information (e.g., "the username does not exist") until a specified threshold throttling value is reached or exceeded by a risk value for the IP address. After the specified threshold throttling value is reached, no information concerning the existence or non-existence of the username is provided to access requests from that source IP address. In accordance with some aspects of the subject matter disclosed herein, no additional information concerning username existence is provided until the IP address is determined to be associated with legitimacy. Any access request including a valid credentials pair such as valid username/password pair, including an access request from the IP address that reached or exceeded the threshold, is allowed to sign in.

In accordance with aspects of the subject matter disclosed herein, when the request is under the throttling threshold, and the username does exist in the domain, true information for the user is returned, that is a message indicating that the username exists will be returned. FIG. 1c illustrates an example of a user interface in which if the username exists, the login page will prompt for a password in managed mode or the user will be redirected to a federated sign-in provider in federated mode. If the credential is correct, sign in is successful. If the request is under the throttling threshold limit, and the username does not exist in the domain, true information for the user is returned: that is, a message indicating that the username does not exist will be returned. An error message such as "Unknown username, check you have typed it correctly or ask your administrator to synchronize your account." will be returned.

If the current access request causes the threshold throttling value to be reached or exceeded, information for the domain name only can be returned. The user can be asked for password (managed mode) or can be redirected to another location (federated mode). If the password is correct, the user can sign in successfully. If the password is incorrect, an ambiguous error message such as "invalid username or password" can be returned. If the username does not exist, an ambiguous error message which may be identical to that provided when the password is incorrect, e.g., "invalid username or password" can be returned.

Various methods for determining an appropriate threshold throttling value are contemplated. Multiple failed username lookups (both against similar named accounts, and uniquely named accounts) is an indicator that an enumeration attack is occurring. Utilizing a dynamic gated threshold that monitors the volume and results (success or failure) of account existence calls can be used to combat attacks. The threshold for blocking IP's from username existence lookups can be tracked on a per domain basis. The threshold can be dynamically gated based on volume of successful and failed username existence calls issued for a particular domain. The dynamic threshold can block an access request originating from a suspect IP address from performing username lookups for a specified period of time. Reaching or exceeding the threshold throttling value does not block an access request in which a correct credentials pair is submitted. Hence, reaching or exceeding the threshold throttling value does not block sign-ins from the originating IP address. It will block the disclosure of user-level information. It will be appreciated that although described in the context of credentials comprising a username and password pair, the subject matter is not limited thereto. Use of any credentials comprising identifying credential and authenticating credential are contemplated.

Protecting Against Malicious Discovery of Account Existence

Figure 1H:
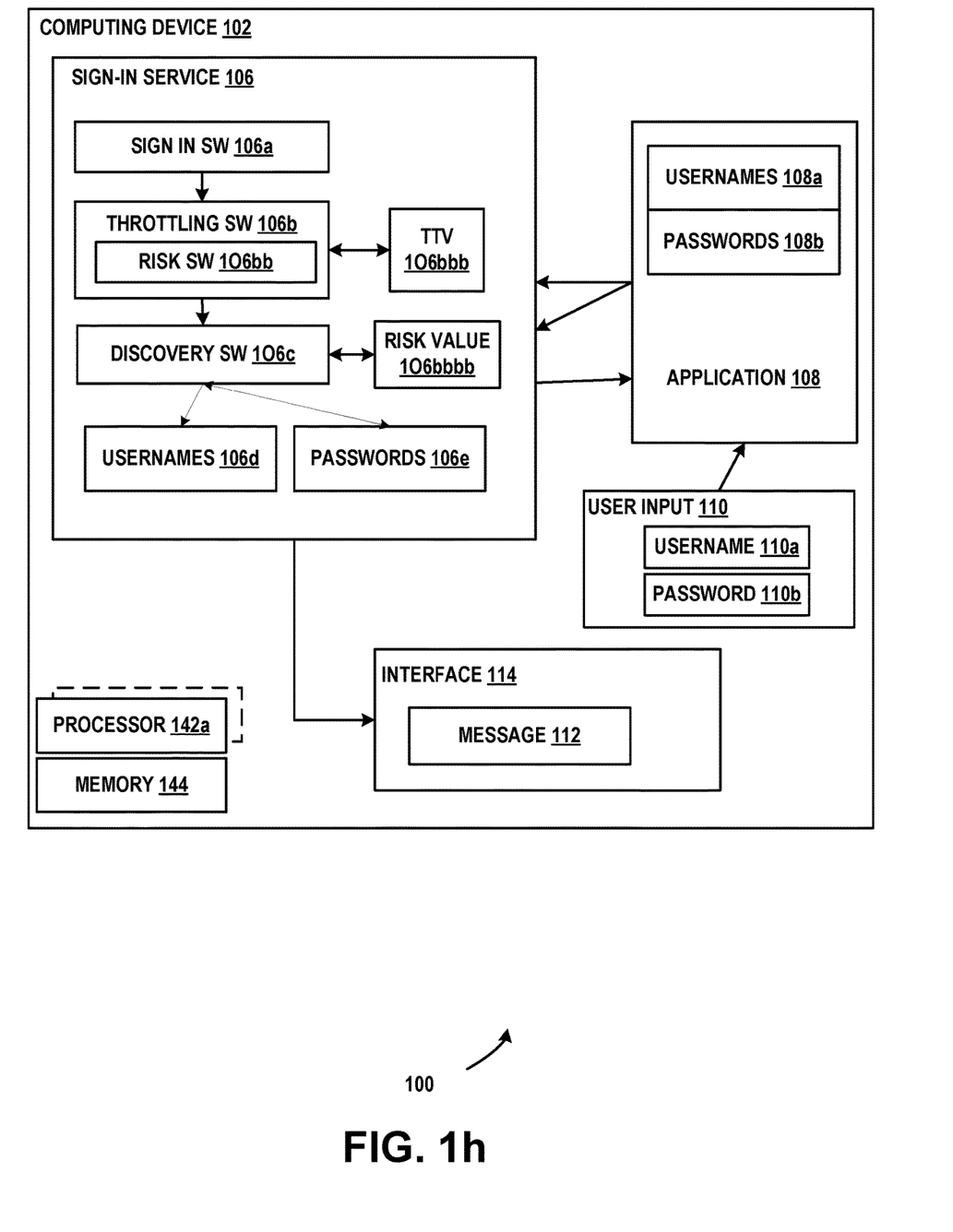
FIG. 1h is a block diagram 100 representing an example of a system for protecting against illegitimate discovery of account existence while providing an enhanced user experience in accordance with aspects of the subject matter described herein.

FIG. 1h is a block diagram representing a system 100 for protecting against illegitimate discovery of account existence while providing an enhanced user experience in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in. System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, servers, virtual machines, devices including databases, firewalls and so on. A computing device such as computing device 102 can include one or more processors such as processor 142, etc., and a memory such as memory 144 that communicates with the one or more processors.

System 100 may include one or more program modules which when loaded into the memory and accessed by the one or more processors configure the processor or processors to perform the actions attributed to the one or more program modules. System 100 can include one or more of: an sign-in service 106 and one or more applications 108, etc. that use the sign-in service. The sign-in service can include one or more of: sign-in software such as sign-in sw 106a, throttling software such as throttling sw 106b, discovery software such as discovery sw 106c, a database of valid usernames such as usernames 106d and/or a database of valid authenticating credentials such as passwords 106e. The sign-in service 106 can include one or more sign-in flows. A sign in flow is a series of interfaces presented to a user during the sign-in process. In a primarily consumer-oriented environment, a user may only be asked to enter a password if the username entered is invalid. In a primarily organization-oriented environment, a user may always be asked to enter a password. The sign-in service can operate in federated or managed mode as described more fully above.

Throttling software such as throttling sw 106b can either be turned on or turned off for a sign-in service utilized by an application. Throttling sw 106b can include risk software such as risk sw 106bb that can execute dynamically as the sign-in service operates. A threshold throttling value (e.g., TTV 106bbb) can be specified. The threshold throttling value can be a value indicating a number of incorrect attempts or a number calculated from ratios of incorrect, correct and total attempts to access a particular domain from the same IP address in a specified period of time before a change in behavior (i.e., throttling) is triggered. The threshold throttling value can be tailored to a particular user or type of user. For example, the threshold throttling value can be larger for an enterprise that has many employees or users and smaller for an enterprise that has fewer employees or users. The threshold throttling value can be larger for larger enterprises (however "large" is measured such as by gross sales, net sales, number of employees, etc.) and smaller for smaller enterprises or consumers. The threshold throttling value can be smaller for enterprises that hold highly sensitive information and larger for enterprises that hold less sensitive information, and so on. The threshold throttling value can be calculated based on a number of invalid requests from a particular IP address(es) within the time period, from a ratio of invalid and valid access requests from the particular IP address(es) within the time period, from a ratio of all requests from a particular IP address(es) within the time period and valid access requests from the particular IP address(es) within the time period, from a ratio of all requests from the particular IP address(es) within the time period and invalid access requests from the particular IP address(es) within the time period and so on. The threshold throttling value can be tailored to a particular domain or to characteristics of different types of domains and/or to the sensitivity of the information the domain holds.

The throttling software can include risk software that can monitor the risk that an access request is illegitimate. The risk value can be determined from one or more factors comprising: the frequency (quantity or volume over a particular specified time period) of access requests for a particular username, the quantity of requests for a particular username per session, the frequency of valid requests for a particular username, frequency of invalid requests for a particular username, the quantity of valid requests for a particular username, the quantity of invalid requests for a particular username per session, the frequency of requests to access a domain associated with a username, the volume of requests to access a domain associated with a username per session, the frequency of valid requests to access a domain associated with a username, the volume of valid requests to access a domain associated with a username per session, the frequency of invalid requests to access a domain associated with a username, the volume of invalid requests to access a domain associated with a username per session, the frequency of requests from a particular IP address or range of IP addresses to a particular username, the quantity of requests from a particular IP address or range of IP addresses to a particular username per session, the frequency of valid requests from a particular IP address or range of IP addresses to access a particular username, the volume of valid requests from a particular IP address or range of IP addresses to access a particular username per session, the frequency of invalid requests from a particular IP address or range of IP addresses to access a particular username, the volume of invalid requests to access a particular username per session, the frequency of requests from a particular IP address or range of IP addresses to a particular domain associated with a username, the quantity of requests from a particular IP address or range of IP addresses to a particular domain associated with a username, the frequency and/or quantity pre session of access requests from the IP address(es) to the domain that succeed (the user is able to sign in) and the frequency and/or quantity per session of access requests from the IP address(es) to the domain that fail (the user is unable to sign in). Risk value can be determined using any combination of the tracked information. The risk value such as risk value 106*bbbb* can be updated by each access request and can represent the risk that the access request comes from an unauthorized user. When the dynamically determined risk value reaches or exceeds a specified threshold, a change in processing behavior is triggered as described herein. In accordance with some aspects of the subject matter disclosed herein, the risk value is determined after processing an access request so that for example, a risk value determined to be 100 for access request 1000 when the threshold throttling value is 100 would be applied to the next access request received (access request 1001).

In accordance with some aspects of the subject matter described herein, until the risk threshold throttling value is reached, account existence/non-existence is revealed, providing an enhanced user experience. Once the threshold throttling value is reached or exceeded, existence/non-existence of the account is not revealed. In accordance with some aspects of the subject matter disclosed herein, after the threshold throttling value is reached or exceeded, whether a valid account identifier is entered or whether a valid account identifier is not entered, the requester is prompted for password. If the password is correct, the user can sign in successfully. If the password is incorrect, an ambiguous error message such as "invalid username or password" can be returned. If the username does not exist, an ambiguous error message which may be identical to that provided when the password is incorrect, e.g., "invalid username or password" can be returned. Whether the threshold throttling value is not reached or exceeded or is reached or exceeded, entering a valid username and password pair provides access to the computer system.

The volume of requests to access a domain from a particular IP address or range of IP addresses within a specified period of time, the number of access requests from the IP address(es) to the domain that succeed (the user is able to sign in) and the number of access requests from the IP address(es) to the domain that fail (the user is unable to sign in) within the specified time period can be monitored and tracked. A threshold throttling value can be calculated using the tracked information. The threshold throttling value can be calculated based on a number of invalid requests from a particular IP address(es) within the time period, from a ratio of invalid and valid access requests from the particular IP address(es) within the time period, from a ratio of all requests from a particular IP address(es) within the time period and valid access requests from the particular IP address(es) within the time period, and/or from a ratio of all requests from the particular IP address(es) within the time period and invalid access requests from the particular IP address(es) within the time period. The threshold throttling value can be tailored to a particular domain or to characteristics of different types of domains and/or to the sensitivity of the information the domain holds.

Discovery software 106*c* can perform domain level or user level discovery. In domain level discovery, the part of the username that precedes the @ sign is ignored and no unambiguous account existence information is provided. If an invalid user name such as, for example, invalidusername@somedomain.com is entered, the user can be prompted for a password and a message such as "unrecognized username or password" can be returned. In user level discovery unambiguous messages can be displayed. For example, if an invalid username is received, an error message that indicates that the username is invalid can be returned. When an invalid password is received, if passwords are stored on the sign-in service, an error message that indicates that the password is invalid can be returned.

Application 108 can employ the services of sign-in service 106. Application 108 can include a directory of usernames such as usernames 108a. Usernames 108a can be provided to the sign-in service 106 and can be periodically synchronized with the username 106d as the usernames 108a are updated. Passwords 108b can be provided to the sign-in service when the application is utilizing the sign-in service 106 in managed mode. Passwords 108b can be periodically synchronized with as the passwords 106e as passwords 108b are updated. User input 110 (including identification credential such as username 110a and/or authenticating credential such as password 110b) can be received by application 108 and can be provided to sign-in service 106. Sign-in service 106 can operate as described above and can return message 112 in interface 114. Message 112 can be displayed on a display device or provided in some appropriate way. Upon receiving a valid username and password pair access to application 108 can be provided. Access can be provided using a token or other suitable mechanism.

Figure 2:
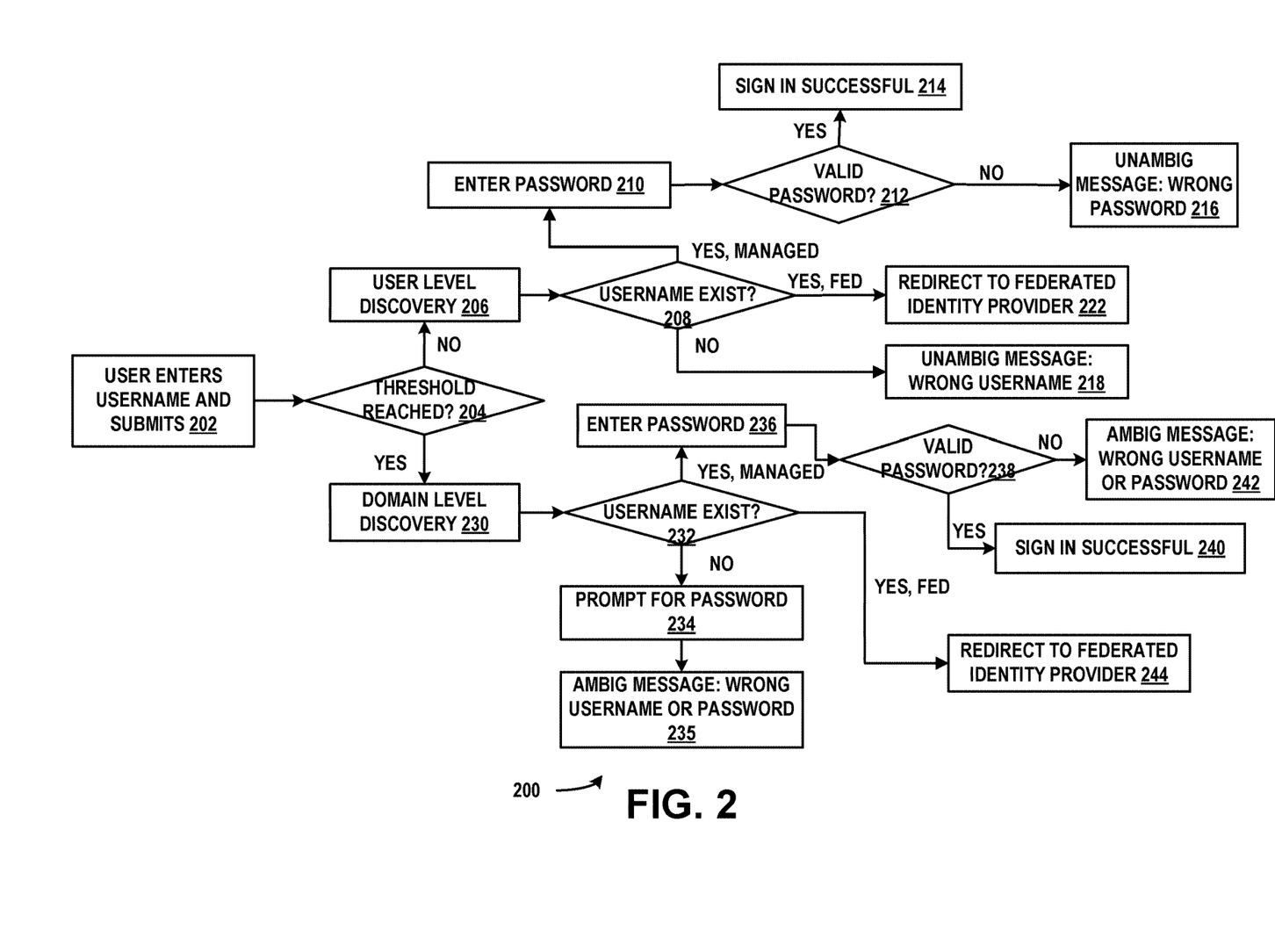
FIG. 2 illustrates an example of a method 200 for protecting against illegitimate discovery of account existence while providing an enhanced user experience in accordance with aspects of the subject matter described herein.

FIG. 2 illustrates an example of a method 200 for protecting against illegitimate discovery of account information while providing an enhanced user experience in accordance with aspects of the subject matter described herein. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated. Method 200 or portions thereof may be executed by a system or a portion of a system such as system 100h.

At operation 202 an access request can be received by the sign-in service. A user can enter a username and submit the username. A value representing a risk that the user is unauthorized can be dynamically determined. The determined risk value can be based on a combination of factors including one or more of: the frequency (quantity or volume over a particular specified time period) of access requests for a particular username, the quantity of requests for a particular username per session, the frequency of valid requests for a particular username, frequency of invalid requests for a particular username, the quantity of valid requests for a particular username, the quantity of invalid requests for a particular username per session, the frequency of requests to access a domain associated with a username, the volume of requests to access a domain associated with a username per session, the frequency of valid requests to access a domain associated with a username, the volume of valid requests to access a domain associated with a username per session, the frequency of invalid requests to access a domain associated with a username, the volume of invalid requests to access a domain associated with a username per session, the frequency of requests from a particular IP address or range of IP addresses to a particular username, the quantity of requests from a particular IP address or range of IP addresses to a particular username per session, the frequency of valid requests from a particular IP address or range of IP addresses to access a particular username, the volume of valid requests from a particular IP address or range of IP addresses to access a particular username per session, the frequency of invalid requests from a particular IP address or range of IP addresses to access a particular username, the volume of invalid requests to access a particular username per session, the frequency of requests from a particular IP address or range of IP addresses to a particular domain associated with a username, the quantity of requests from a particular IP address or range of IP addresses to a particular domain associated with a username, the frequency and/or quantity pre session of access requests from the IP address(es) to the domain that succeed (the user is able to sign in) and the frequency and/or quantity per session of access requests from the IP address(es) to the domain that fail (the user is unable to sign in). The information can be monitored and tracked.

A threshold throttling value can be provided. The threshold throttling value represents a value that when reached or exceeded by the current risk value indicates that it is likely that the access request is illegitimate. The threshold throttling value can be determined using any combination of the tracked information. The threshold throttling value can be calculated based on a number of invalid requests from a particular IP address(es) within the time period, from a ratio of invalid and valid access requests from the particular IP address(es) within the time period, from a ratio of all requests from a particular IP address(es) within the time period and valid access requests from the particular IP address(es) within the time period, from a ratio of all requests from the particular IP address(es) within the time period and invalid access requests from the particular IP address(es) within the time period and so on. The threshold throttling value can be tailored to a particular domain or to characteristics of different types of domains and/or to the sensitivity of the information the domain holds. The threshold throttling value can be associated with an access request and can represent the risk that the access request comes from an unauthorized user.

At operation 204 in response to the dynamically calculated risk value being under the provided throttling threshold value, processing can continue at operation 206. In response to reaching or exceeding the throttling threshold value, processing can continue at operation 230. At operation 206 user level discovery can be performed. At operation 208 in response to determining that the username exists (e.g., operating in managed mode), the password prompt can be displayed at operation 210. At operation 212, user level discovery can be performed to determine if the password exists in the sign-in system. If the password is found, at operation 214 access is granted to the application (sign-in is successful). If the password is not found, at operation 216, an unambiguous message is returned (e.g., "password not found"). At operation 208 in response to determining that the username exists (operating in federated mode), the user can be redirected to the federated login page at operation 222.

At operation 208 in response to determining that that the username does not exist, an unambiguous message can be returned (such as but not limited to "unknown username, please check your input") at operation 218. At operation 204 in response to the dynamically calculated risk value reaching or exceeding the provided throttling threshold value, processing can continue at operation 230. At operation 230 domain level discovery can be performed. At operation 232, discovery to determine if the username exists can be performed. When the sign-in system is operating in managed mode, password can be prompted for at operation 236. In response to receiving a valid password at operation 238, access can be granted at operation 240. In response to receiving an invalid password at operation 238, at operation 242 an ambiguous message can be returned (e.g., invalid username or password). At operation 232 discovery to determine if the username exists can be performed. When the sign-in system is operating in federated mode, the user can be redirected to the federated login page at operation 244. At operation 232 discovery to determine if the username exists can be performed. In response to receiving an invalid username at operation 232, at operation 234, a prompt for password can be displayed and upon receiving a password an ambiguous message can be returned (e.g., invalid username or password) at operation 235.

Disclosed herein is a computing device comprising a memory connected to one or more processors. The one or more processors can be configured to provide a sign-in service. The sign-in service may display an unambiguous message regarding the existence or non-existence of a username in UPN format when a sign-in value associated with the access request made by a user is exceeded by a threshold value. In response to determining that the sign-in request value associated with the username in UPN format exceeds the threshold value, an ambiguous message regarding existence/non-existence of the username can be displayed. Access to an application utilizing the sign-service is allows allowed when a valid username and authenticating credential pair is received by the sign-in service. The sign-in value is calculated dynamically based on a combination of factors associated with the username, comprising at least one of: frequency of access requests for the username; quantity of access requests for the username; frequency of access requests for a domain portion of the username; quantity of access requests for a domain portion of the username; frequency of valid requests for the username; quantity of valid requests for the username; frequency of valid requests for a domain portion of the username; quantity of valid requests for a domain portion of the username; frequency of valid requests from a requestor's IP address for the username; quantity of valid requests from a requestor's IP address for the username; frequency of valid requests for a domain portion of the username from a requestor's IP address; quantity of valid requests for a domain portion of the username from a requestor's IP address. The sign-in service can support federated user accounts for which a third party identity provider performs credentials validation. The access request can be redirected to a location under control of an enterprise for the credentials validation. In response to determining that the threshold value exceeds a sign-in request value, an unambiguous message regarding non-existence of a username is displayed in response to receiving an invalid username. The sign-in service can be authoritative for validating credentials of users. User level discovery can be performed when the sign-in request value is exceeded by the threshold value. Domain level discovery can be performed when the threshold value exceeds the sign-in request value.

Disclosed herein is a method of providing an enhanced sign-in service that protects against enumeration attacks. In response to a processor of a computing device determining that a sign-in request value associated with a username in UPN format is exceeded by a threshold value, an unambiguous message regarding existence/non-existence of the username can be displayed. In response to determining that the sign-in request value exceeds the threshold value, an ambiguous message regarding existence/non-existence of the username can be displayed. Access to an application utilizing the sign-in service is always allowed when a valid username and password pair is received by the sign-in service. A user of the sign-in service can be an enterprise. A user of the sign-in service can be a consumer. Domain level discovery can result in providing ambiguous messages regarding validity/invalidity of credentials in the domain. User level discovery can result in providing unambiguous messages regarding existence/non-existence of username in the domain. In response to determining that a sign-in request value is exceeded by the threshold value user level discovery provides unambiguous messages regarding existence/non-existence of username in the domain. Processing can switch from domain level processing to user level processing in response to determining that a sign-in request value is exceeded by the threshold value wherein user level discovery results in providing unambiguous messages regarding existence/non-existence of authenticating credential in the domain. In response to determining that a sign-in request value is exceeded by the threshold value, processing can switch from domain level processing to user level processing.

Disclosed herein is a sign-in system protected from enumeration attacks. The system can include a memory connected to at least one processor, the at least one processor configured to determine a threshold value for providing an enhanced sign-in experience from a sign-in service, in response to determining that a sign-in request value associated with a username in UPN format is exceeded by the threshold value, display an unambiguous message regarding existence/non-existence of the username, in response to determining that the sign-in request value exceeds the threshold value, display an ambiguous message regarding existence/non-existence of the username; and always allow access to an application utilizing the sign-in service when a valid username and authenticating credential pair is received by the sign-in service. The sign-in value can be calculated dynamically based on a combination of factors associated with the username, comprising one or more of: frequency of access requests for the username; quantity of access requests for the username; frequency of access requests for a domain portion of the username; quantity of access requests for a domain portion of the username; frequency of valid requests for the username; quantity of valid requests for the username; frequency of valid requests for a domain portion of the username; quantity of valid requests for a domain portion of the username; frequency of valid requests from a requestor's IP address for the username; quantity of valid requests from a requestor's IP address for the username; frequency of valid requests for a domain portion of the username from a requestor's IP address; quantity of valid requests for a domain portion of the username from a requestor's IP address. The sign-in service can support federated user accounts for which a third party identity provider performs credentials validation. The sign-in service can be authoritative for validating credentials of users. User level discovery can be performed when the sign-in request value is exceeded by the threshold value and domain level discovery can be performed when the threshold value exceeds the sign-in request value.

Example of a Suitable Computing Environment

Figure 3:
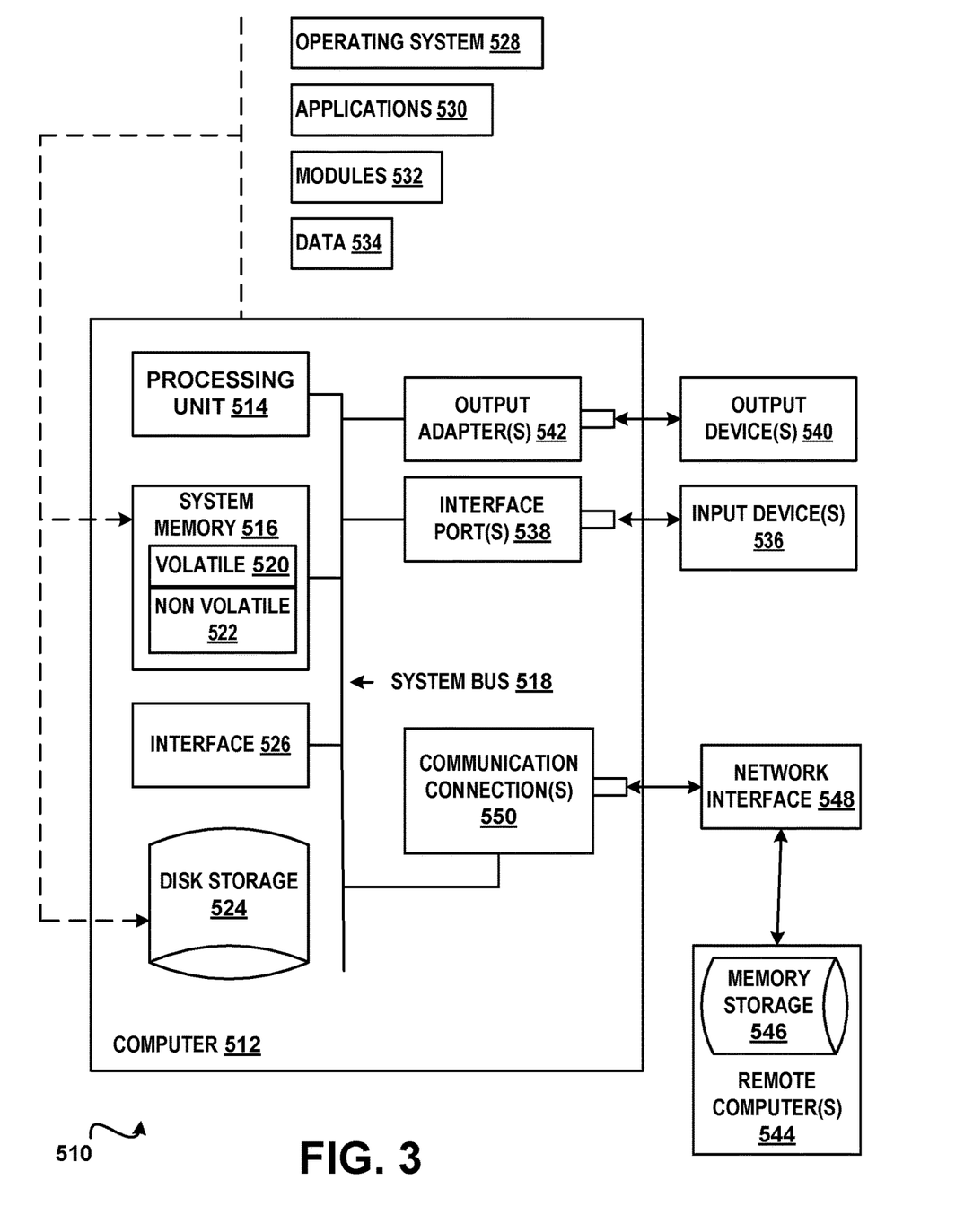
FIG. 3 is a block diagram of an example of a computing environment in accordance with aspects of the subject matter described herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above.

Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computing device comprising:
a memory connected to at least one processor, the at least one processor configured to provide a sign-in service that:
dynamically calculates a risk value based on a combination of factors associated with a username including a frequency of valid requests for a domain portion of the username from a requestor's IP address within a particular time period, and, a quantity of valid requests for the domain portion of the username in UPN format from the requestor's IP address within the particular time period;
in response to determining that the risk value associated with the username in UPN format is exceeded by a threshold value, displays an unambiguous message regarding existence/non-existence of the username, wherein the threshold value is specified based on a particular user, a type of user, a size of an enterprise, sensitivity of information, the domain portion, characteristics of a type of the domain portion, or sensitivity of information the domain portion holds;
in response to determining that the risk value associated with the username in UPN format exceeds the threshold value, displays an ambiguous message regarding existence/non-existence of the username; and
always allows access to an application utilizing the sign-in service when a valid username and authenticating credential pair is received by the sign-in service, wherein user level discovery is performed when the risk value is less than the threshold value and wherein domain level discovery is performed when the threshold value is greater than or equal to the risk value.

2. The computing device of claim 1, wherein the combination of factors associated with the username further comprises at least one of:
frequency of access requests for the username;
quantity of access requests for the username;
frequency of access requests for the domain portion of the username;
quantity of access requests for the domain portion of the username;
frequency of valid requests for the username;
quantity of valid requests for the username;
frequency of valid requests from the requestor's IP address for the username; or
quantity of valid requests from the requestor's IP address for the username.

3. The computing device of claim 1, wherein the sign-in service supports federated user accounts for which a third party identity provider performs credentials validation.

4. The computing device of claim 3, wherein an access request is redirected to a location under control of an enterprise for the credentials validation.

5. The computing device of claim 4, wherein in response to determining that the threshold value exceeds the risk value, an unambiguous message regarding non-existence of a username is displayed in response to receiving an invalid username.

6. The computing device of claim 1, wherein the sign-in service is authoritative for validating credentials of users.

7. A method of providing an enhanced sign-in service that protects against enumeration attacks, the method comprising:
dynamically calculating a risk value based on a combination of factors associated with a username including a frequency of valid requests for a domain portion of the username from a requestor's IP address within a particular time period, and, a quantity of valid requests for the domain portion of the username in UPN format from the requestor's IP address within the particular time period;
in response to determining, by a processor of a computing device, the risk value associated with the username in UPN format is exceeded by a threshold value, displaying an unambiguous message regarding existence/non-existence of the username, wherein the threshold value is specified based on a particular user, a type of user, a size of an enterprise, sensitivity of information, the domain portion, characteristics of a type of the domain portion, or sensitivity of information the domain portion holds;
in response to determining that the risk value exceeds the threshold value, displaying an ambiguous message regarding existence/non-existence of the username; and
always allowing access to an application utilizing the sign-in service when a valid username and authenticating credential pair is received by the sign-in service, wherein user level discovery is performed when the risk value is less than the threshold value and wherein domain level discovery is performed when the threshold value is greater than or equal to the risk value.

8. The method of claim 7, wherein a user of the sign-in service is a consumer.

9. The method of claim 7, wherein a user of the sign-in service is an enterprise.

10. The method of claim 7, wherein domain level discovery results in providing ambiguous messages regarding validity/invalidity of credentials in the domain.

11. The method of claim 7, wherein user level discovery results in providing unambiguous messages regarding existence/non-existence of usernames in the domain.

12. The method of claim 7, further comprising: in response to determining that the risk value is less than the threshold value, switching from domain level processing to user level processing.

13. A sign-in system protected from enumeration attacks, the sign-in system comprising:
a memory connected to at least one processor, the at least one processor configured to:
determine a threshold value for providing an enhanced sign-in experience from a sign-in service;
dynamically calculate a risk value based on a combination of factors associated with a username including a frequency of valid requests for a domain portion of the username from a requestor's IP address within a particular time period, and, a quantity of valid requests for the domain portion of the username in UPN format from the requestor's IP address within the particular time period;
in response to determining that the risk value associated with the username in UPN format is exceeded by the threshold value, display an unambiguous message regarding existence/non-existence of the username, wherein the threshold value is specified based on a particular user, a type of user, a size of an enterprise, sensitivity of information, the domain portion, characteristics of a type of the domain portion, or sensitivity of information the domain portion holds;
in response to determining that the risk value exceeds the threshold value, display an ambiguous message regarding existence/non-existence of the username; and
always allow access to an application utilizing the sign-in service when a valid username and authenticating credential pair is received by the sign-in service, wherein user level discovery is performed when the risk value is less than the threshold value and wherein domain level discovery is performed when the threshold value is greater than or equal to the risk value.

14. The sign-in system of claim 13, wherein the combination of factors associated with the username further comprises at least one of:
frequency of access requests for the username;
quantity of access requests for the username;
frequency of access requests for the domain portion of the username;
quantity of access requests for the domain portion of the username;
frequency of valid requests for the username;
quantity of valid requests for the username;
frequency of valid requests from the requestor's IP address for the username; or
quantity of valid requests from the requestor's IP address for the username.

15. The sign-in system of claim 13, wherein the sign-in service supports federated user accounts for which a third party identity provider performs credentials validation.

16. The sign-in system of claim 13, wherein the sign-in service is authoritative for validating credentials of users.

* * * * *